Figure 1:
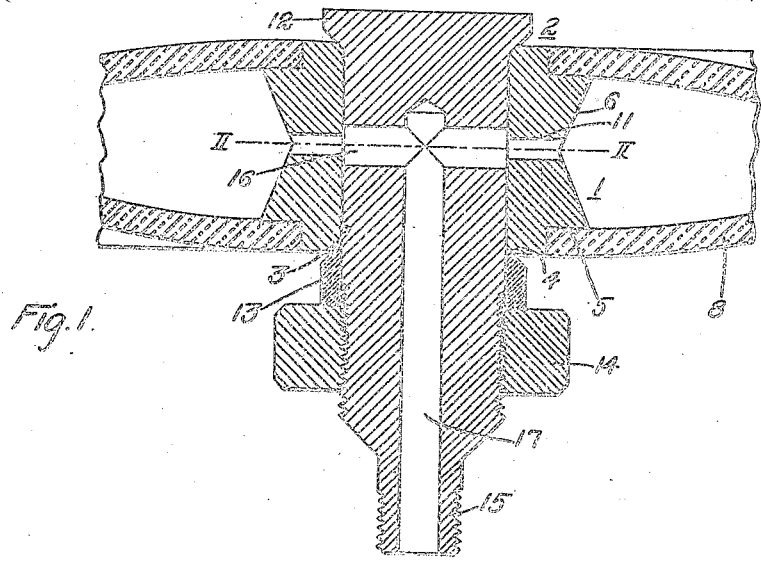

D. A. DICKEY.
APPARATUS FOR USE IN MOLDING PROPELLERS.
APPLICATION FILED FEB. 15, 1919.

1,358,712. Patented Nov. 16, 1920.

WITNESSES:

INVENTOR
Daniel A. Dickey.
BY
ATTORNEY

UNITED STATES PATENT OFFICE.

DANIEL ADAM DICKEY, OF WILKINSBURG, PENNSYLVANIA, ASSIGNOR TO WESTINGHOUSE ELECTRIC & MANUFACTURING COMPANY, A CORPORATION OF PENNSYLVANIA.

APPARATUS FOR USE IN MOLDING PROPELLERS.

1,358,712.

Specification of Letters Patent. Patented Nov. 16, 1920.

Application filed February 15, 1919. Serial No. 277,242.

*To all whom it may concern:*

Be it known that I, DANIEL A. DICKEY, a citizen of the United States, and a resident of Wilkinsburg, in the county of Allegheny and State of Pennsylvania, have invented a new and useful Improvement in Apparatus for Use in Molding Propellers, of which the following is a specification.

My invention relates to apparatus for use in molding bodies of fibrous material impregnated with a suitable binder which may be hardened by the simultaneous application of heat and pressure and more particularly for use in the molding of hollow bodies.

In an application filed by Louis T. Frederick, December 30, 1918, Serial No. 268,952, Case No. 6060 and assigned to the Westinghouse Electric & Manufacturing Company, is disclosed a method of molding hollow bodies, and more particularly propellers, by assembling suitably impregnated fibrous sheet material about a properly shaped core of readily fusible material, preferably a metallic alloy, disposing the assembled body and its core in a mold and compacting the body and hardening its binder by application of sufficient heat to fuse the core and by applying pressure to the core.

My present invention relates to an apparatus for transmitting the desired pressure to the fused core during the molding operation and for removing the fused core from the propeller after the molding has been completed.

One of the objects of my invention is to provide an apparatus of this character which is permanent in nature and may, consequently, be used repeatedly. Another object which I have in view is the provision of an apparatus which is simple in construction and may be cheaply made and which will prevent waste of the material constituting the fusible core.

A still further object of my invention resides in providing, as a part of the apparatus, an element which may remain as a permanent part of the propeller construction and which may be employed as a hub bushing.

With these and other objects in view, my invention will be more fully described, illustrated in the drawings, in the several views of which corresponding numerals indicate like parts, and then particularly pointed out in the claims.

Figure 2:
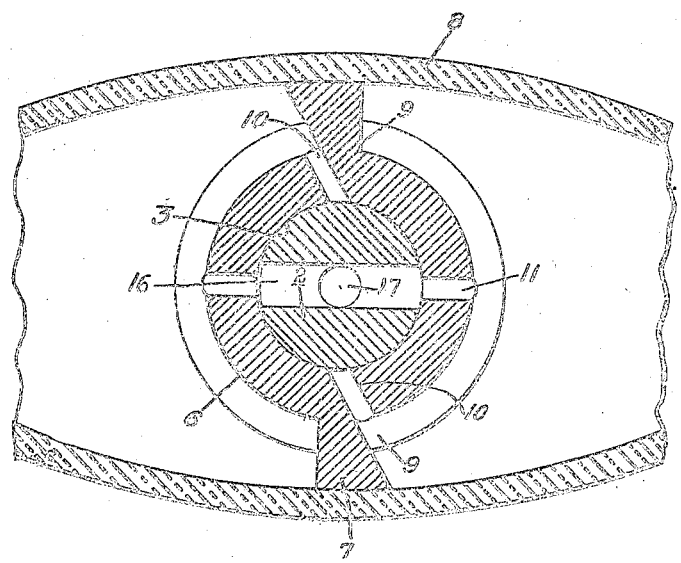

Figure 1 is a sectional view of my apparatus shown in connection with a portion of a hollow propeller, the section being taken axially of my apparatus and longitudinally of the propeller; Fig. 2 is a transverse, sectional view of the structure shown in Fig. 1, taken on substantially the line II—II thereof.

Broadly speaking, my invention comprises two main elements, namely, a hub-bushing 1 and a coöperating spindle 2. The bushing 1, which may be formed of any suitable metal, such as steel, is substantially cylindrical in shape and is provided with an axial spindle-receiving bore 3 which may be subsequently employed to receive a propeller hub. The bore 3 is preferably formed with frusto-conical seats 4 at its ends and is reduced adjacent to its ends to provide annular shoulders or seats 5. Furthermore, the bushing periphery is preferably of double frusto-conical shape to form an annular groove or channel 6, the sides of which extend to the ends of its body portion. The bushing is provided externally with oppositely disposed radially extending wings 7, as shown in Fig. 2 of the drawings, the outer edges of which are adapted to abut against the wall of a hollow propeller 8 so that the bushing, as a whole, constitutes a partition between the blades of the propeller to prevent flow of a fused core, from either blade to the other.

As will be noted, the face of one wing, which is directed toward one end of the propeller, and the face of the other wing which is directed toward the opposite end of the propeller are outwardly inclined toward such ends of the propeller to provide, with adjacent portions of the grooves 6, pockets 9, and the body of the bushing is formed with correspondingly inclined passages 10, the outer ends of which terminate at the bases of the pockets 9 and the inner ends of which terminate at the bore of the bushing at opposite points thereof. The body of the bushing is further provided with radial passages 11 disposed intermediate the passages 10 and opening into the base of the channel 6.

Coöperating with the above described bushing is a spindle 2 which is shaped and proportioned to fit snugly within the axial bore 3 of the bushing and one end of which is provided with a peripheral flange or annular shoulder 12 having an inclined inner face for snug engagement against one of the seats 4 of the bushing. When the spindle is applied to the bushing, as shown in Fig. 1, a gasket 13, of soft metal or other suitable material, is passed over the non-flanged end of the bushing and is shaped to engage snugly against the other seat 4 of the bushing. A jam nut 14 having threaded engagement with the spindle, may be turned against the gasket 13 so that the flanged end of the spindle and the gasket may be forced into close engagement with the respective seats of the bushing. The end of the spindle beyond the jam nut may preferably be reduced and externally threaded, as indicated at 15, to adapt it for attachment to any suitable supply pipe, (not shown).

The spindle is formed with a diametrally located bore 16 which may be alined with the passages 11 of the bushing when the spindle is applied thereto and with an axial bore or passage 17 communicating, at one end, with the bore 16 and opening, at its opposite end, through the reduced threaded end 15 of the spindle.

When employing the above described apparatus, the bushing may be embedded in a core of readily fusible material, such as a low-melting-point metallic alloy, in such position that, when a propeller has been formed about the core, it will constitute a bushing for the hub of the propeller. Care should be taken that the wings of the bushing occupy the position indicated in Fig. 2 in order that they may effectively serve their purpose.

With the core and bushing thus assembled, a propeller body may be formed about the core, in any suitable manner, to engage the annular seats 5 at the ends of the bushing so that, when the propeller is finished, the bushing will be securely locked in place. The propeller body may be formed by superimposing layers of suitable fibrous sheet material, such as paper or duck, impregnated with any desirable binder, such as a phenolic condensation product, about the core, one method of doing this being fully disclosed in the previously-referred-to application of Louis T. Frederick.

The spindle may them be applied in a manner which will be apparent from reference to Fig. 1 of the drawing, and the assembled propeller body, together with its inclosed core, bushing and the spindle, may be positioned in a suitable mold where it may be subjected to heat, in any suitable manner, to fuse the core.

Suitable pipe connection may be made with the threaded terminal 15 of the spindle to permit forcing a fluid through the spindle against the fused core whereby the latter may be caused to exert pressure against the inner wall of the propeller to firmly compact the material of the propeller and, in conjunction with the applied heat, to harden the binder. Preferably, the fluid, by means of which the pressure is applied, comprises the same material as the core so that there will be no mingling of different fluids to be subsequently separated.

After the propeller has been cured in this manner, it may be removed from the mold and the spindle may be withdrawn from the bushing. With the core still in its fused condition, the propeller may be tilted in such manner as to cause the fused metal contained in one blade to run through one of the openings 11 and one of the openings 10 into a suitable receptacle and to then cause the metal in the opposite blade to run through the opposite openings 10 and 11. Because of the pockets 9, formed by the inclined faces of the wings 7 in conjunction with the annular grove or channel 6, it is possible to completely drain all of the fused metal from the propeller while the wings prevent the metal from running from end to end of the propeller. Obviously, the passages 11 may be omitted and the bore 16 of the spindle may be alined with the inner ends of the passages 10. However, the passages 11 increase the rate at which the fused core may be drained from the propeller and are, therefore, desirable.

It is obvious that, while the bushing and the spindle coöperate to provide means for applying pressure to the fused core during the molding operation, it may be possible to employ the bushing and to provide other means for supplying the pressure than the spindle shown. Because of this and also because of the fact that the bushing remains a permanent part of the propeller, while the spindle may be used repeatedly in the manufacture of numerous propellers, I claim, as my invention in this application, the combination of the spindle and bushing and the structure of the spindle and I have claimed the bushing *per se* in a separate application filed by me February 15, 1919, Serial No. 277,241, Case No. 6188.

As various modifications in the construction of the several parts may be made, it will be understood that no limitations are to be imposed upon my invention other than those indicated in the appended claims.

I claim as my invention:

1. A device for use in molding hollow propellers, by means of a fusible core, which comprises a hub-bushing adapted to be embedded in a core and to be molded into the propeller, the hub-bushing being provided with a plurality of openings for admitting fluid pressure to the core and with means for draining the core from a finished propeller.

2. A device for use in molding propellers, by the use of a fusible core, which comprises a hub-bushing adapted to be embedded in a core and to be molded into a propeller formed thereon and being formed with an axial bore and with passages leading from the bore to communicate with the interior of a propeller formed about the core in which the bushing is embedded, and a temporary spindle adapted to be clamped tightly within the axial bore of the bushing and provided with a passage communicating with the passages of the bushing and opening through one end of the spindle.

3. In a device for molding hollow propellers, by the use of a fusible core, the combination with a hub-bushing adapted to be embedded in a core and to be molded into the propeller and formed with opposed wings adapted to engage the inner wall of the propeller to act as a closure between the blade portions thereof and to provide drainage pockets having a wall inclined toward the bushing, the bushing being formed with a spindle-receiving bore and with passages opening therefrom to the inner portions of the pockets, of a temporary spindle adapted to be tightly clamped in the spindle-receiving bore of the bushing and formed with a passage communicating with the passages of the bushing and opening through one end of the spindle.

4. In a device for molding hollow propellers, by the use of a fusible core, the combination with a hub-bushing adapted to be embedded in a core and to be molded into a propeller formed about the core, the bushing being formed with a spindle-receiving opening and with passages leading from the opening to communicate with the interior of the propeller, of a spindle adapted to be tightly clamped within the spindle-receiving bore and formed with a passage communicating with those of the bushing and opening through one end of the spindle.

5. In a device for use in molding hollow propellers, by the use of a fusible core, a temporary spindle comprising a substantially cylindrical body formed at one end with an annular shoulder and externally threaded at its opposite end, and a gasket and a jam-nut mounted upon the spindle, the spindle being formed in spaced relation to the shoulder with a diametral passage and also being formed with an axial passage opening through one end of the spindle and communicating at its opposite end with the first passage.

In testimony whereof, I have hereunto subscribed my name this 28th day of Jan. 1919.

DANIEL ADAM DICKEY.